No. 660,781. Patented Oct. 30, 1900.
H. M. PAINE.
PESSARY.
(Application filed Aug. 5, 1899.)
(No Model.)
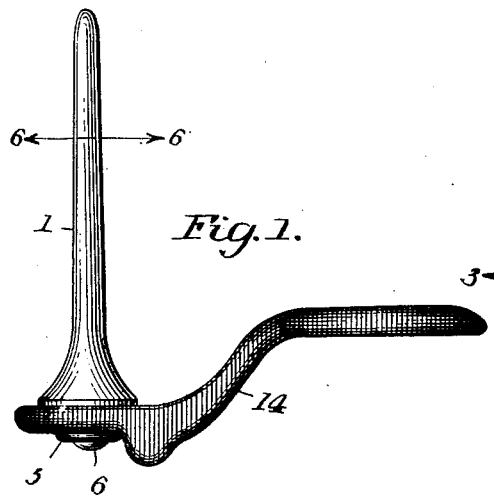
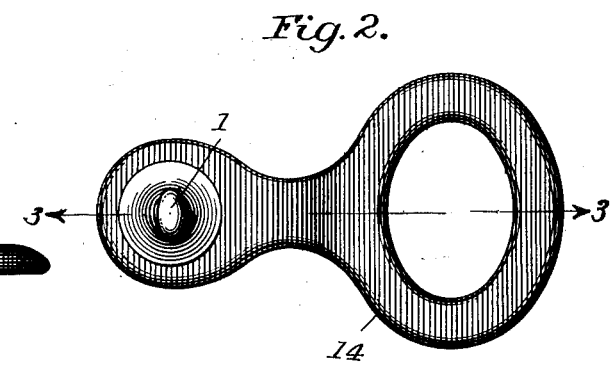
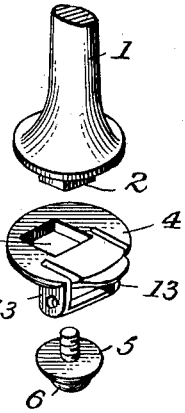
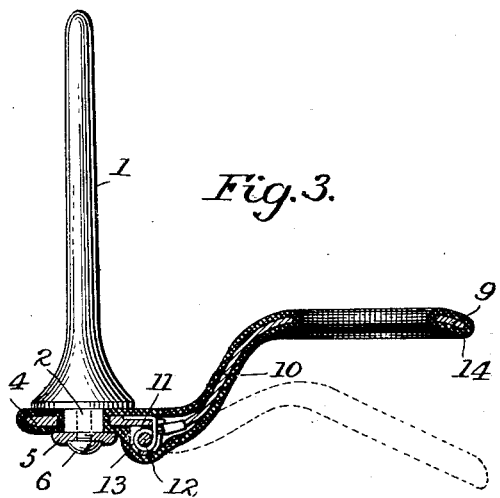
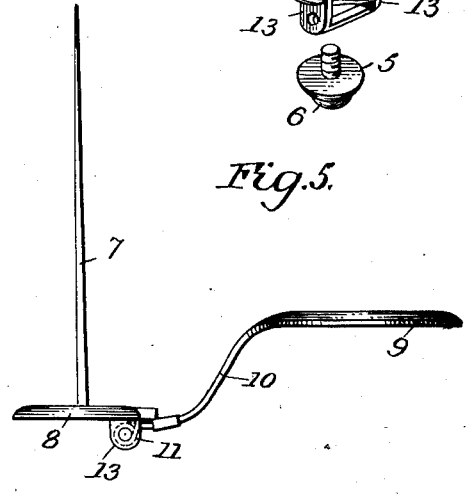
Witnesses
J. G. Hinkel
C. W. Clement
Inventor
Horace M. Paine
By Watson & Watson
Attorneys

UNITED STATES PATENT OFFICE.

HORACE MARSHFIELD PAINE, OF NEWTON, MASSACHUSETTS.

PESSARY.

SPECIFICATION forming part of Letters Patent No. 660,781, dated October 30, 1900.

Application filed August 5, 1899. Serial No. 726,315. (No model.)

*To all whom it may concern:*

Be it known that I, HORACE MARSHFIELD PAINE, a citizen of the United States of America, and a resident of Newton, in the county of Middlesex and State of Massachusetts, have invented certain new and useful Improvements in Pessaries, of which the following is a specification.

This invention relates to pessaries; and its object is to improve the construction of the instrument heretofore patented to me in Letters Patent No. 536,540, dated March 26, 1895.

The several improvements will be particularly described in connection with the drawings which form a part of this specification, and in which—

Figure 1 is a side view of my improved pessary. Fig. 2 is a plan view thereof. Fig. 3 is a side view, the base being shown in section on line 3 3 of Fig. 2. Fig. 4 shows the stem-locking parts in perspective and separated. Fig. 5 is a side view of a modification, and Fig. 6 is a section on line 6 6 of Fig. 1.

The instrument previously patented to me is defective in several respects, which defects are remedied in the present invention. Thus in the patented instrument the stem is united to the base by a threaded shank screwed into a threaded socket. I have found that the threads in the socket wear rapidly, being formed in celluloid or similar material, and that after the stems have been removed a few times for cleaning or exchange they cannot be securely fitted to the base.

According to the present invention the stem 1 is provided with a shank 2 of angular cross-section, which fits a socket 3 of similar outline in the base 4 of the instrument. The stem 1 is flattened or elliptical in cross-section, as shown in Fig. 6, and the angular shank and socket are for the purpose of holding said stem, with its flattened sides, always in the same relation to the instrument. The flattened stem conforms more naturally to the channel to which it is adapted than the round stems shown in my former patent. The stem is held in place by a washer 5 and screw 6, as shown in Figs. 1, 3, and 4.

The preferred form of the invention is shown in Figs. 1 to 4, inclusive.

In Fig. 5 I have shown the frame of a modified instrument, in which the stem 7 is permanently connected to the base 8. In this case the entire instrument, including the base and stem, is to be covered with rubber or other cleanly material impervious to the fluids to which the instrument is exposed. The balance of the construction shown in Fig. 5 is the same as that shown in the other figures.

To the base a supporting-ring 9 is connected by means of a suitable spring-hinge. As shown, an arm 10 of the supporting-ring is connected, by solder or other suitable means, to one branch of a spring 11, which is coiled about a pin 12, supported in lugs or hangers 13, depending from the base. The other branch of the spring is connected to the base, and the parts are arranged to assume naturally the relative positions shown in Fig. 3. The supporting-ring, however, may be swung down to the position shown in Fig. 3 in dotted lines, and when so depressed it has a gentle lifting tendency, due to the spring-hinge.

In my patented instrument difficulty was experienced in keeping the joint between the base and arm in an aseptic condition, it being impossible to thoroughly cleanse it. This defect I have remedied by inclosing the entire base, supporting-ring, and hinge in an envelop or coating 14 of material which is impervious to fluid and which may be cleansed with disinfectants without injury. The portion of the envelop surrounding the hinge is flexible, preferably of soft rubber, and the entire coating may be of the same material. The skeleton frame shown in Fig. 5 is designed to be coated all over, including the stem, with rubber or other suitable material. The envelop permits the hinge-joint to work freely and at the same time protects it from corrosion. The instrument as thus contructed is thoroughly practical and may be easily cleansed and sterilized.

The stem 1 (shown in Figs. 1 to 4) may be formed of hard rubber, celluloid, or other similar material. The frame about which the coating 9 is formed is preferably of brass or other metal.

Having described my invention, what I claim, and desire to secure by Letters Patent, is—

1. A pessary of the character described comprising, in combination, the base, the supporting-ring, the spring-hinge connecting the base and supporting-ring, the flexible envelop inclosing said hinge, and the stem fixed in said base.

2. A pessary of the character described comprising, in combination, the base having an angular socket, the stem of elliptical cross-section and having a shank of angular cross-section adapted to said socket, means for locking said shank in said socket, the supporting-ring, and the spring-hinge connecting said ring to said base.

3. A pessary of the character described comprising, in combination, the base having an angular socket, the supporting-ring, the spring-hinge connecting said base and ring, the soft-rubber envelop completely inclosing said base, ring, and hinge, the stem of elliptical cross-section and having an angular shank to fit the socket in the base, and the screw to retain said shank in said socket.

Signed by me at Newton, Massachusetts, this 26th day of June, 1899.

HORACE MARSHFIELD PAINE.

Witnesses:
HATTIE A. ROSS,
THERESA J. MAHONEY.